United States Patent
Norman Gray et al.

(10) Patent No.: US 11,378,172 B2
(45) Date of Patent: Jul. 5, 2022

(54) CLUTCH FOR BELT DRIVE SYSTEM

(71) Applicant: DEERE & COMPANY, Moline, IL (US)

(72) Inventors: Jacqueline Norman Gray, Rock Island, IL (US); Javier Reyna Gándara, Apodaca (MX); Joey A. Mock, Coal Valley, IL (US); Nicholas M. Barden, Annawan, IL (US)

(73) Assignee: Deere & Company, Moline, IL (US)

( * ) Notice: Subject to any disclaimer, the term of this patent is extended or adjusted under 35 U.S.C. 154(b) by 328 days.

(21) Appl. No.: 16/843,504

(22) Filed: Apr. 8, 2020

(65) Prior Publication Data

US 2021/0317905 A1    Oct. 14, 2021

(51) Int. Cl.
*F16H 55/36* (2006.01)
*A01D 69/06* (2006.01)
*F16H 7/08* (2006.01)

(52) U.S. Cl.
CPC ............. *F16H 55/36* (2013.01); *A01D 69/06* (2013.01); *F16H 2007/0806* (2013.01); *F16H 2007/0868* (2013.01); *F16H 2007/0887* (2013.01)

(58) Field of Classification Search
CPC ........... F16H 7/0827; F16H 2007/0893; F16H 2007/0806; A01D 34/6812
USPC ................................................ 474/119, 121
See application file for complete search history.

(56) References Cited

U.S. PATENT DOCUMENTS

| | | | | |
|---|---|---|---|---|
| 258,242 A * | 5/1882 | Merritt | ......................... | 474/134 |
| 367,891 A * | 8/1887 | Canning | ............... | F16H 7/0827 474/119 |
| 402,758 A * | 5/1889 | Medart | ................. | F16H 7/0827 474/119 |
| 858,813 A * | 7/1907 | Loos | ......................... | B60P 1/38 414/439 |
| 932,000 A * | 8/1909 | Cressman | ............. | F16H 7/0827 474/119 |
| 1,188,810 A * | 6/1916 | Mitchell | ........................ | 474/134 |
| 1,792,165 A * | 2/1931 | Hollinger | ................. | A01C 3/06 474/121 |
| 2,176,431 A * | 10/1939 | Malkin | ..................... | D21F 7/02 474/119 |
| 2,195,229 A * | 3/1940 | SMart | ....................... | F16H 7/02 474/119 |
| 2,504,624 A * | 4/1950 | Barnes | ..................... | F16H 35/10 474/119 |
| 2,696,741 A * | 12/1954 | Wilkin | .................. | F16H 7/0827 474/119 |
| 2,827,804 A * | 3/1958 | Wolfenden | ................ | B27C 9/04 144/1.1 |
| 3,351,200 A * | 11/1967 | Burenga | ................ | A01D 17/14 209/384 |

(Continued)

FOREIGN PATENT DOCUMENTS

WO    WO19138310 A1    7/2019

*Primary Examiner* — Henry Y Liu

(57) ABSTRACT

Systems, apparatus, and methods for tensioning systems of a drive belt are disclosed. Particularly, tensioning systems for a drive belt of a rotary screen of a harvester combine are disclosed. The tensioning system provides for avoiding over-tensioning the drive belt when the drive belt is disengaged from a drive shaft. The tensioning system may also provide for maintaining continuous operation of the drive shaft as the drive belt is moved between engagement and disengagement with the drive shaft.

20 Claims, 9 Drawing Sheets

(56) References Cited

U.S. PATENT DOCUMENTS

| | | | | |
|---|---|---|---|---|
| 3,439,793 A * | 4/1969 | Rakestraw | A24B 3/16 | 198/689.1 |
| 3,550,463 A * | 12/1970 | Halls | F16H 7/0827 | 474/119 |
| 3,816,981 A * | 6/1974 | Carnewal | B01D 45/14 | 55/467 |
| 3,837,149 A * | 9/1974 | West | F01P 11/12 | 55/400 |
| 3,938,586 A * | 2/1976 | Barlow | F01P 11/12 | 55/290 |
| 4,036,070 A * | 7/1977 | Knight | F16H 7/0827 | 474/119 |
| 4,060,964 A * | 12/1977 | Eaves | D02G 1/0266 | 57/284 |
| 4,223,757 A * | 9/1980 | Olander | F16H 7/0827 | 476/17 |
| 4,233,040 A * | 11/1980 | Vogelaar | A01D 41/12 | 55/467 |
| 4,324,552 A * | 4/1982 | Boushek, Jr. | A01D 69/08 | 474/135 |
| 4,338,642 A * | 7/1982 | Clark | G11B 25/043 | 474/119 |
| 4,409,779 A * | 10/1983 | Bent | A01D 34/6812 | 56/11.6 |
| 4,439,218 A * | 3/1984 | Priepke | B01D 46/10 | 55/288 |
| 4,498,889 A * | 2/1985 | Stevens | F16H 9/14 | 474/135 |
| 4,542,785 A * | 9/1985 | Bagnall | F01P 11/12 | 165/41 |
| 4,557,710 A * | 12/1985 | Greider | A01D 34/69 | 474/119 |
| 4,582,504 A * | 4/1986 | Schlapman | A01D 34/6806 | 474/119 |
| 4,723,933 A * | 2/1988 | Marto | B60K 25/06 | 474/135 |
| 5,012,632 A * | 5/1991 | Kuhn | A01D 34/76 | 474/84 |
| 5,183,487 A * | 2/1993 | Lodico | F01P 11/12 | 55/289 |
| 5,354,241 A * | 10/1994 | Trefz | F16H 7/0827 | 474/135 |
| 5,466,189 A * | 11/1995 | Deutsch | F01P 11/12 | 460/119 |
| 6,142,239 A * | 11/2000 | Underhill | A01B 45/023 | 172/50 |
| 6,142,240 A * | 11/2000 | Underhill | A01B 45/023 | 172/22 |
| 6,248,145 B1 * | 6/2001 | Radke | F01P 11/12 | 55/297 |
| 6,321,849 B1 * | 11/2001 | Underhill | A01B 45/02 | 414/501 |
| 7,875,093 B1 * | 1/2011 | Hershbarger | B01D 46/10 | 55/482 |
| 7,946,367 B2 * | 5/2011 | Good | B01D 46/0056 | 180/68.1 |
| 8,057,335 B1 * | 11/2011 | Langenfeld | F16H 7/0827 | 474/119 |
| 8,454,718 B2 * | 6/2013 | Buchmann | F01P 11/12 | 55/393 |
| 8,888,625 B2 * | 11/2014 | Lehman | F16H 7/1263 | 474/119 |
| 9,939,052 B2 * | 4/2018 | Bailliu | F16H 9/04 | |
| 10,054,199 B2 * | 8/2018 | Newman | F16H 7/1281 | |
| 10,132,390 B2 * | 11/2018 | Gunton | F16H 7/1263 | |
| 2004/0043853 A1 * | 3/2004 | Lundstrom | F16H 7/1281 | 474/119 |
| 2007/0125055 A1 * | 6/2007 | Ducoulombier | A01D 43/10 | 56/11.6 |
| 2007/0155558 A1 * | 7/2007 | Horst | F16H 19/06 | 474/134 |
| 2009/0211208 A1 * | 8/2009 | Johnson | F01P 11/12 | 55/282 |
| 2009/0312079 A1 * | 12/2009 | Good | B01D 46/0056 | 460/119 |
| 2010/0242866 A1 * | 9/2010 | Buchmann | F01P 11/12 | 165/104.19 |
| 2014/0048346 A1 * | 2/2014 | Ricketts | F02M 35/086 | 180/68.1 |
| 2018/0051779 A1 * | 2/2018 | Newman | F16H 7/1281 | |
| 2018/0274500 A1 * | 9/2018 | Underhill | B01D 46/70 | |

\* cited by examiner

CLUTCH FOR BELT DRIVE SYSTEM

FIELD OF THE DISCLOSURE

The present disclosure relates generally to belt drive systems and, more particularly, to belt drive systems of a combine harvester.

BACKGROUND OF THE DISCLOSURE

Combine harvesters utilize rotatable screens as an initial filter to remove material from incoming air used to provide cooling to the combine harvester's engine and, in some implementations, other aspect of the combine harvester.

SUMMARY OF THE DISCLOSURE

A first aspect of the present disclosure is directed to a tensioning device. The tensioning device may include a tensioner pivotable about a first axis. The tensioner may include a first arm rotatable about the first axis; a second arm rotatable about the first axis, the first arm and the second arm pivotable relative to each other; a biasing assembly that couples the first arm and the second arm, the biasing assembly elastically coupling the first arm and the second arm; and a first wheel disposed at an end of the second arm, the first wheel configured to engage a drive belt. The tensioning device may also include a third arm pivotable about the first axis and an actuator coupled to the tensioner and the third arm. The tensioner and the third arm may be moveable about the first axis between a first configuration in which the third arm is configured to be disengaged from the drive belt when the actuator is in a first position and an second configuration in which the third arm is configured to be engaged with the drive belt when the actuator is in a second position, different from the first position.

A second aspect of the present disclosure is directed to a system that may include a rotatable screen defining a circumferential surface; a drive belt engaged with a portion of the circumferential surface; a shaft comprising a first wheel that is selectively engageable with the belt, the rotatable screen rotatable in response to rotation of the shaft that is transmitted to the rotatable screen by the belt; and a tensioning device. The tensioning device may include a tensioner pivotable about a first axis, the tensioner comprising a second wheel that engages the drive belt to produce a selected amount of tension in the drive belt; a clutch arm pivotable about the first axis; and an actuator coupled to the tensioner and the clutch arm, the actuator movable between a first position in which the tensioner and the clutch arm are pivoted into a first configuration in which the clutch arm is free from engagement with the drive belt and a second position in which the tensioner and the clutch arm are pivoted into a second configuration in which the clutch arm engages the drive belt to disengage the drive belt from the first wheel.

The various aspects may include one or more of the following features. The first arm, the second arm, and the third arm may be mounted on a common shaft that defines the first axis. The third arm may be disposed between the first arm and the second arm along the shaft. The biasing assembly may include a first flange engaged with the first arm; a biasing component; a rod pivotably coupled to the second arm; and a second flange coupled to the rod, the biasing component captured between the first flange and the second flange. The biasing element may be a spring, and the rod may extend through the first flange and the second flange. Rotation of the second arm in a first rotational direction relative to the first arm may compress the spring. The actuator may include a handle pivotable about a second axis and a linkage connecting the handle to the first arm and the third arm. The first arm may be rotated by a first amount and the third arm may be rotated by a second amount greater than the first amount when the handle is rotated about the second axis from the first position to the second position. The linkage may include a first link extending from the handle to the first arm and a second link extending from the first link to the third arm. The first link may be coupled to the first arm at a first end of the first arm; the second link may be coupled to a first end of the third arm; and a length of the first end of the third arm may be less than a length of the first end of the first arm. The third arm may include at least one second wheel, and the at least one second wheel may be configured to engage the belt when the third arm is in the second configuration. Movement of the handle from the first position to the second position may cause a first amount of rotation of the first arm and a second amount of rotation of the third arm, the first amount of rotation being less than the second amount of rotation.

The various may also include one or more of the following features. The tensioner may include a first arm and a second arm that are elastically coupled together. The second wheel may be coupled to the second arm, and an elastic force applied between the first arm and the second arm may be applied to the drive belt via the second wheel to generate the selected amount of tension within the drive belt. A first amount of tension generated within the drive belt by the tensioner when the tensioner is in the first configuration may be the same as a second amount of tension generated within the drive belt by the tensioner when the tensioner is in the second configuration. The actuator may include a handle pivotably about a second axis and a linkage connecting the handle to the clutch arm and the first arm. The clutch arm may be rotated by a first amount, and the first arm may be rotated by a second amount less than the first amount when the handle is rotated about the second axis from the first position to the second position. The linkage may include a first link extending from the handle to the first arm and a second link extending from the first link to the clutch arm. The at least one third wheel may include two third wheels that are offset from each other along a length of the clutch arm. Movement of the actuator from the first position to the second position may cause rotation of the second arm in a first rotational direction towards the shaft such that the first wheel is passed between the two third wheels, resulting in the two third wheels separating the drive belt from the first wheel. A biasing assembly may couple the first arm and the second arm. The biasing assembly may include a first flange engaged with the first arm, a biasing component, a rod pivotably coupled to the second arm, and a second flange coupled to the rod. The biasing component may be captured between the first flange and the second flange. The clutch arm may include at least one third wheel that engages the drive belt to disengage the drive belt from the first wheel when the actuator is moved from the first position to the second position. The biasing element may be a spring, and the rod may extend through the first flange and the second flange.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
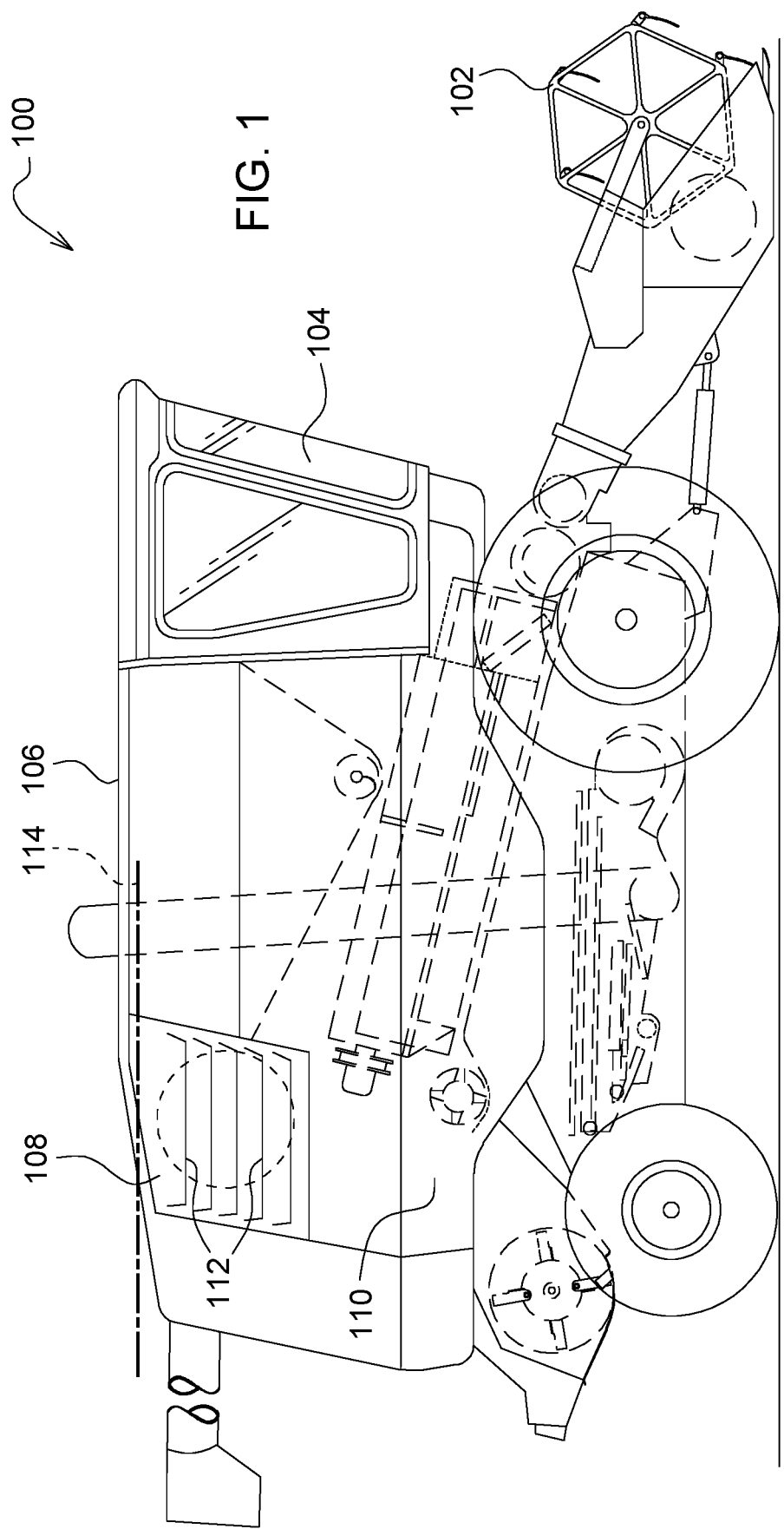
FIG. 1 is a side view of an example combine harvester according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to tensioning systems of air filtration systems of an agricultural vehicle, such as a combine harvester, and, particularly, to tensioning systems for belt drive systems, such as rotary screen assemblies. More particularly, the present disclosure is directed to systems, methods, and apparatuses for selective coupling and decoupling a belt drive systems from a drive source. Although the examples described herein are made in the context of combine harvesters, the scope of the disclosure is not limited thereto. Rather, the concepts described herein are applicable to other agricultural vehicles and equipment as well as other vehicles and equipment outside of the agricultural arts.

FIG. 1 is a perspective view of an example combine harvester 100. A draper header 102 is attached to the combine harvester 100. In other implementations, other types of headers may be used with the combine harvester 100. The combine harvester 100 includes an operator's compartment 104, a bin 106 in which processed grain is stored, and an engine compartment 108. A side panel 110 defining a side of the engine compartment 108 includes a plurality of slots 112 to permit inflow of air to provide convective cooling to various components of the combine harvester 100, such as an engine radiator (heat exchanger), an oil cooler, and an air conditioning condenser.

Figure 2:
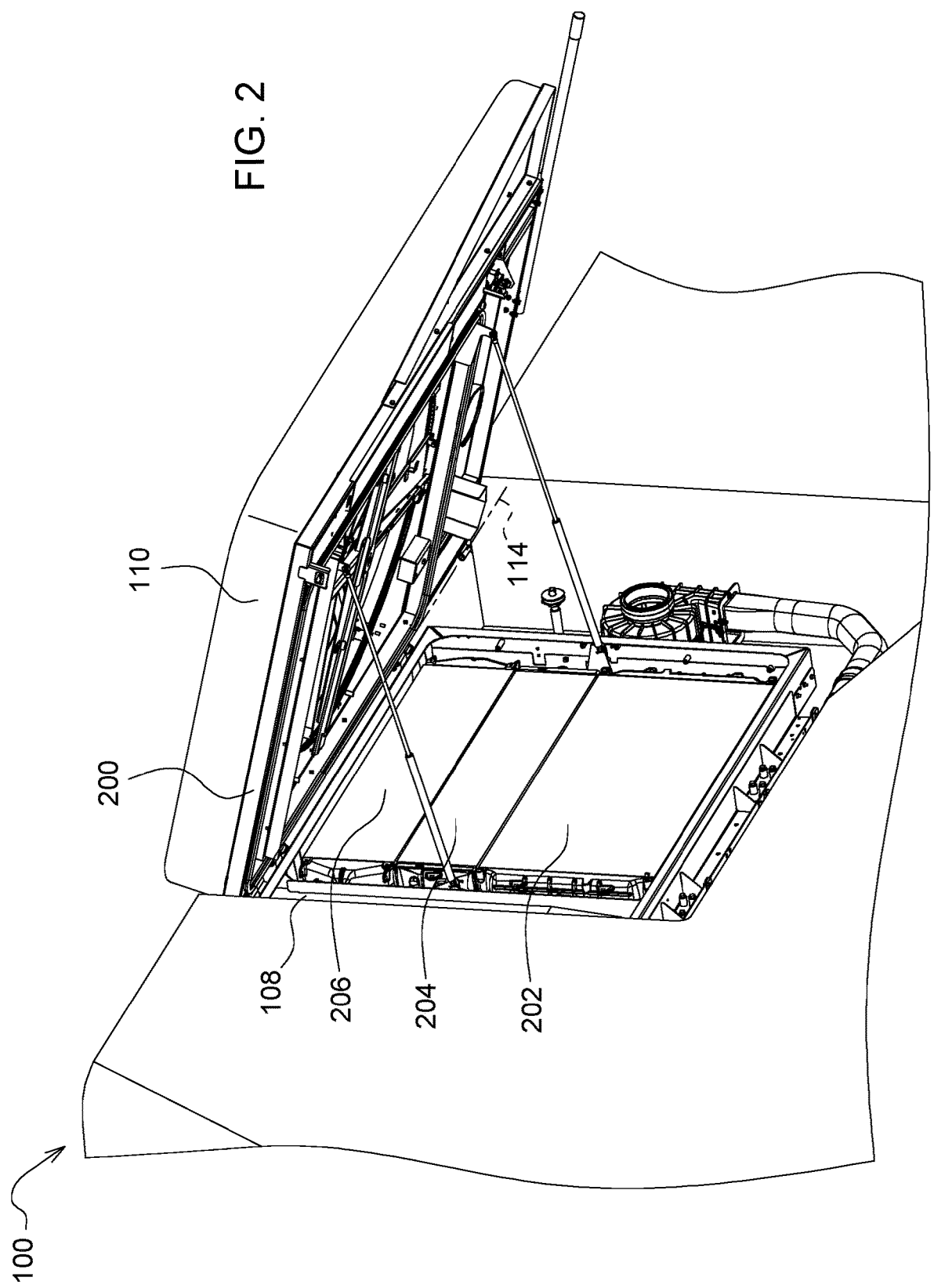
FIG. 2 is a perspective view of a portion of the combine harvester of FIG. 1 showing a side panel and a rotary screen assembly rotated outwardly, according to some implementations of the present disclosure.

The side panel 110 is pivotably coupled, for example, about a horizontal axis 114, to provide access to other components within the engine component. Particularly, the side panel 110 rotates about the horizontal axis 114 into an open configuration to provide access to a belt drive system in the form of a rotary screen assembly 200 as shown in FIG. 2. As shown, the side panel 110 and the rotary screen assembly 200 are rotated about the horizontal axis 114 into an open configuration, exposing the components within the engine compartment 108, such as an engine heat exchanger 202, oil cooler 204, and an air conditioning condenser 206. In some implementations, the side panel 110 and the rotary screen assembly 200 may rotate about different axes.

Figure 3:
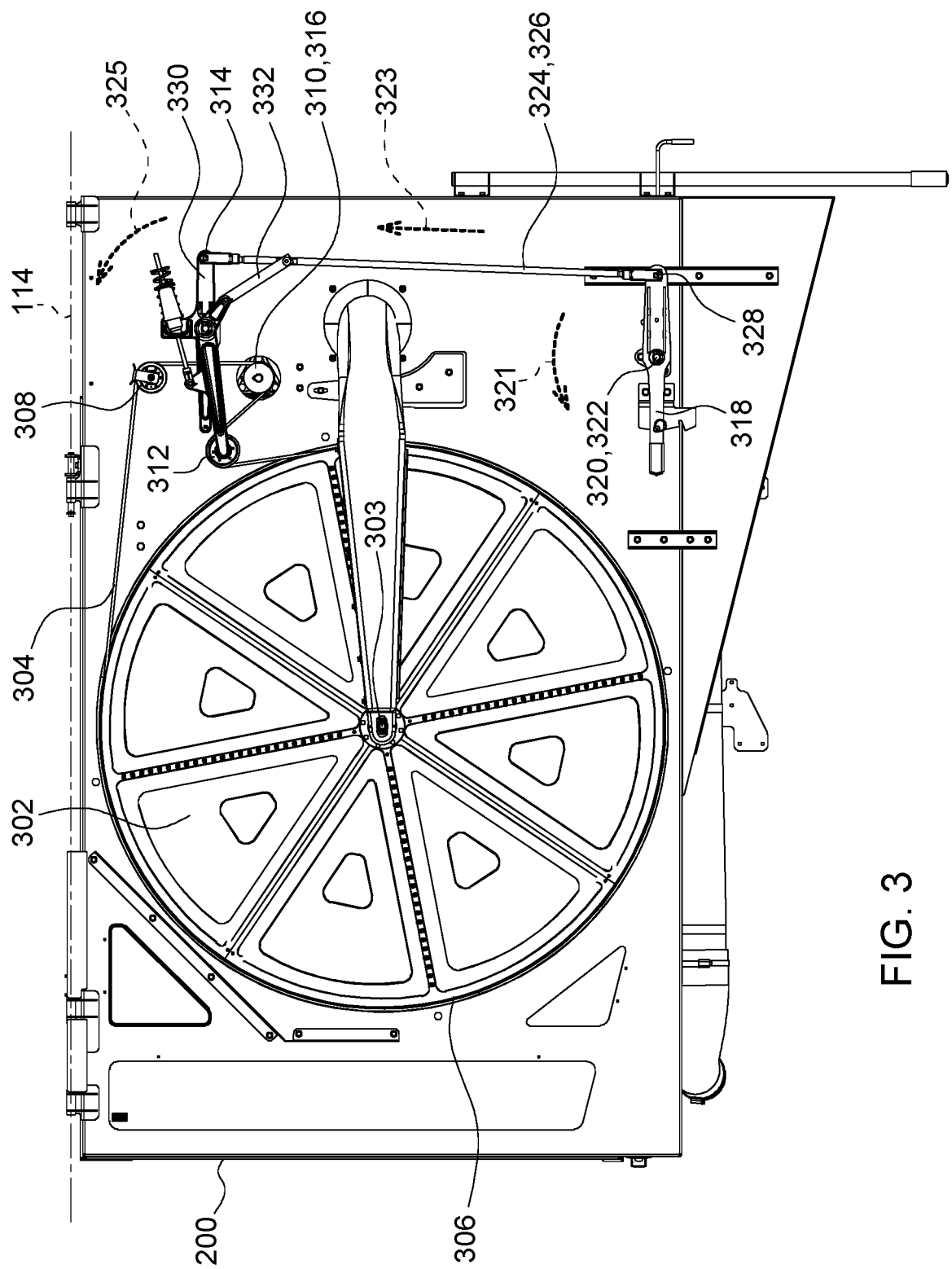
FIG. 3 is a side view of an example rotary screen assembly in which a tensioning system is in a first configuration, according to some implementations of the present disclosure.
Figure 4:
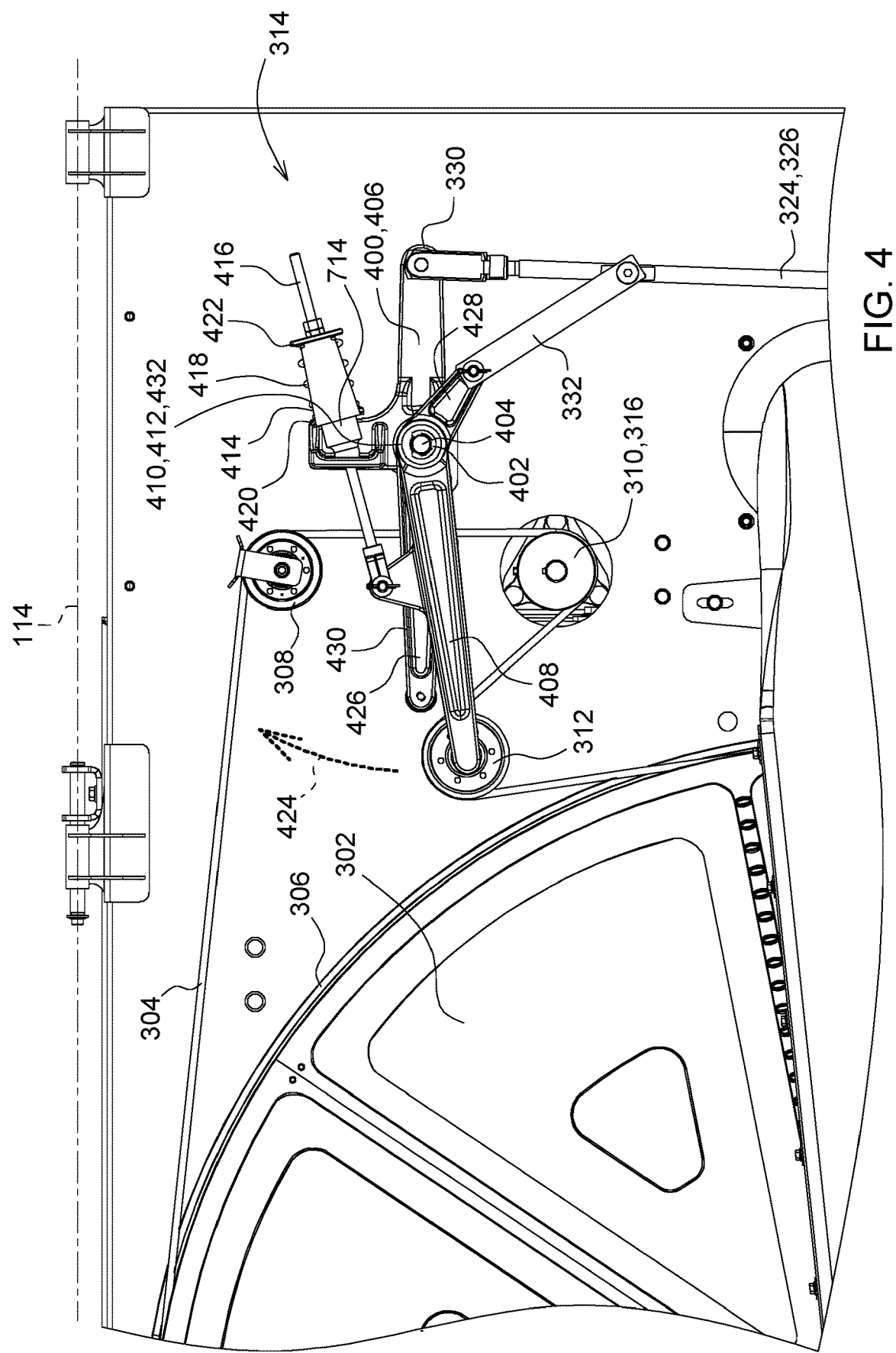
FIG. 4 is a detail view of the tensioning system of the rotary screen assembly of FIG. 1 in the first configuration, according to some implementations of the present disclosure.
Figure 9:
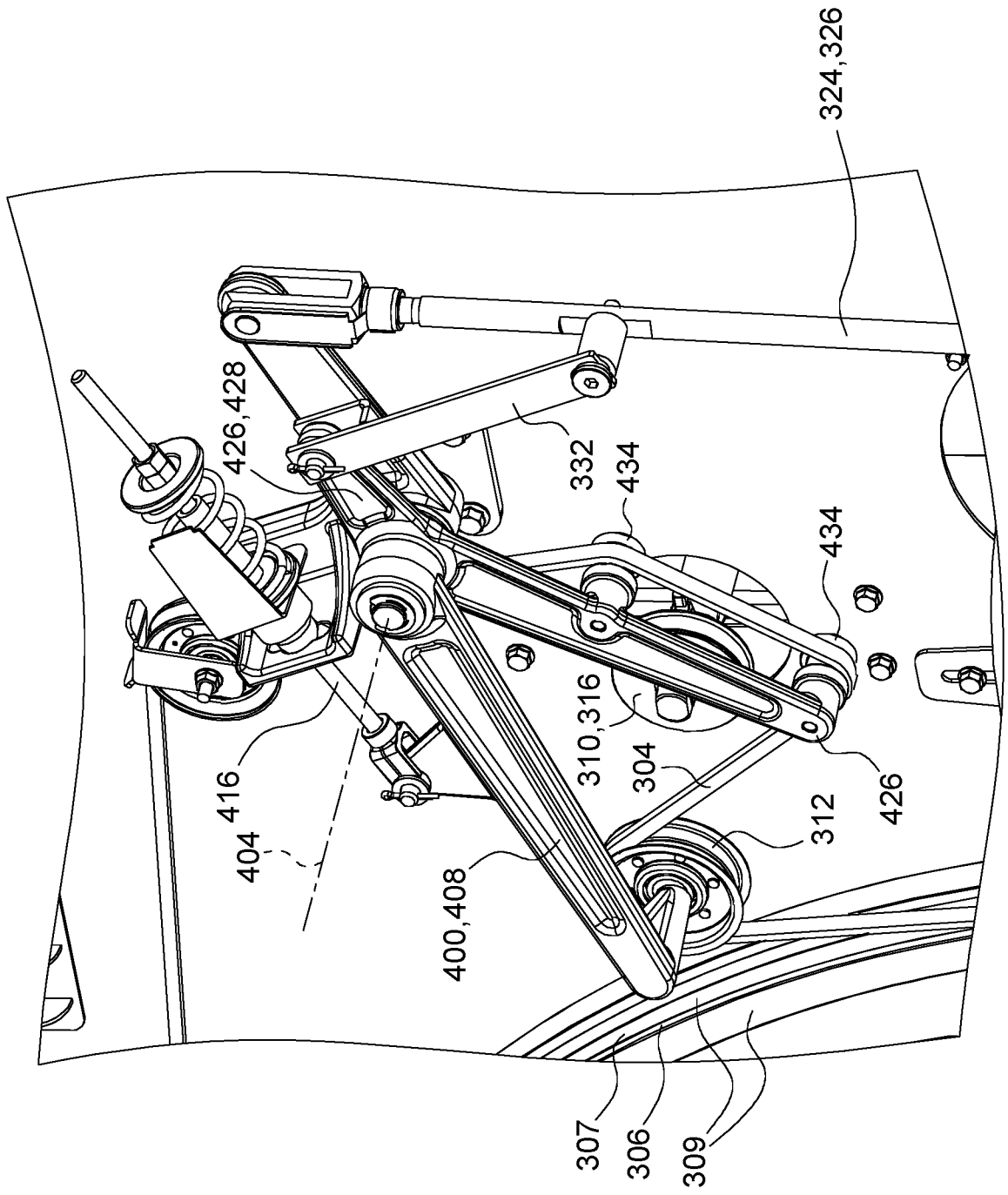
FIG. 9 is another perspective view of the tensioning system of FIG. 1 in the second configuration showing a clutch engaged with a drive belt and the drive belt disengaged from a drive shaft, according to some implementations of the present disclosure.

FIGS. 3 and 4 are front views of the rotary screen assembly 200 includes a rotary screen 302 that rotates about an axis 303. The rotary screen 302 is foraminous, defining a plurality of apertures, and operates to filter air being drawn into the engine compartment 108. The rotary screen 302 rotates about the axis 303 in response to movement of an endless drive belt 304 that engages an outer circumferential surface 306 of the rotary screen 302. The circumferential surface 306 may be provided in a groove or track 307 on the rotary screen 302, as shown in FIG. 9, for example. The track 307 may include sidewalls 309 that capture the drive belt 304 and maintain alignment of the drive belt 304 on the rotary screen 302.

As shown in FIG. 3, the drive belt 304 wraps around the circumferential surface 306, a first idler wheel 308, a drive shaft 310, and a second idler wheel 312 that forms part of a tensioning system 314. The first and second idler wheels 308 and 312 are rotatable in response to movement of the drive belt 304. The tensioning system 314 is operable to selectively engage and disengage the drive belt 304 from the drive shaft 310.

Figure 5:
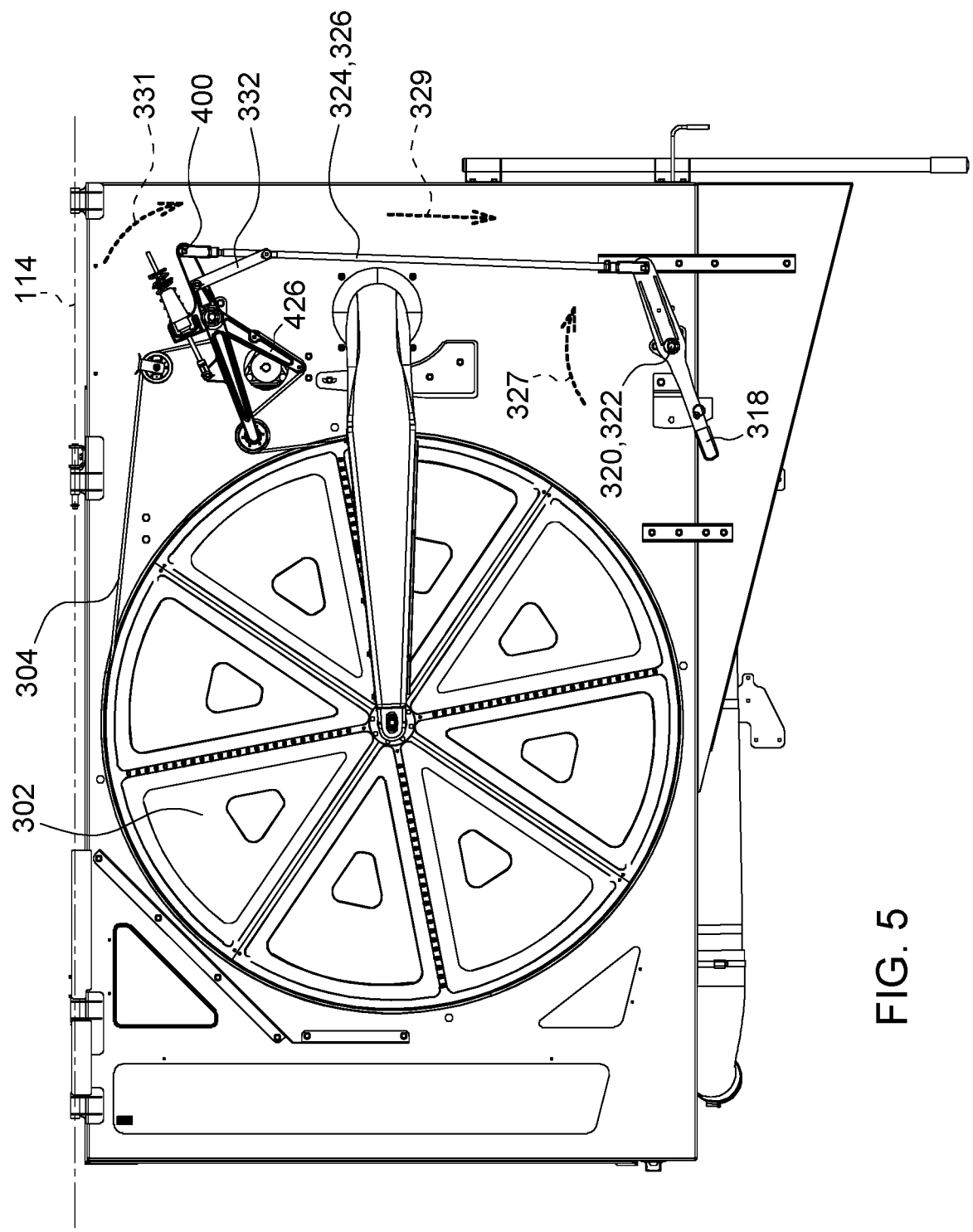
FIG. 5 is a side view of the example rotary screen assembly of FIG. 1 in which the tensioning system is in a second configuration, according to some implementations of the present disclosure.
Figure 6:
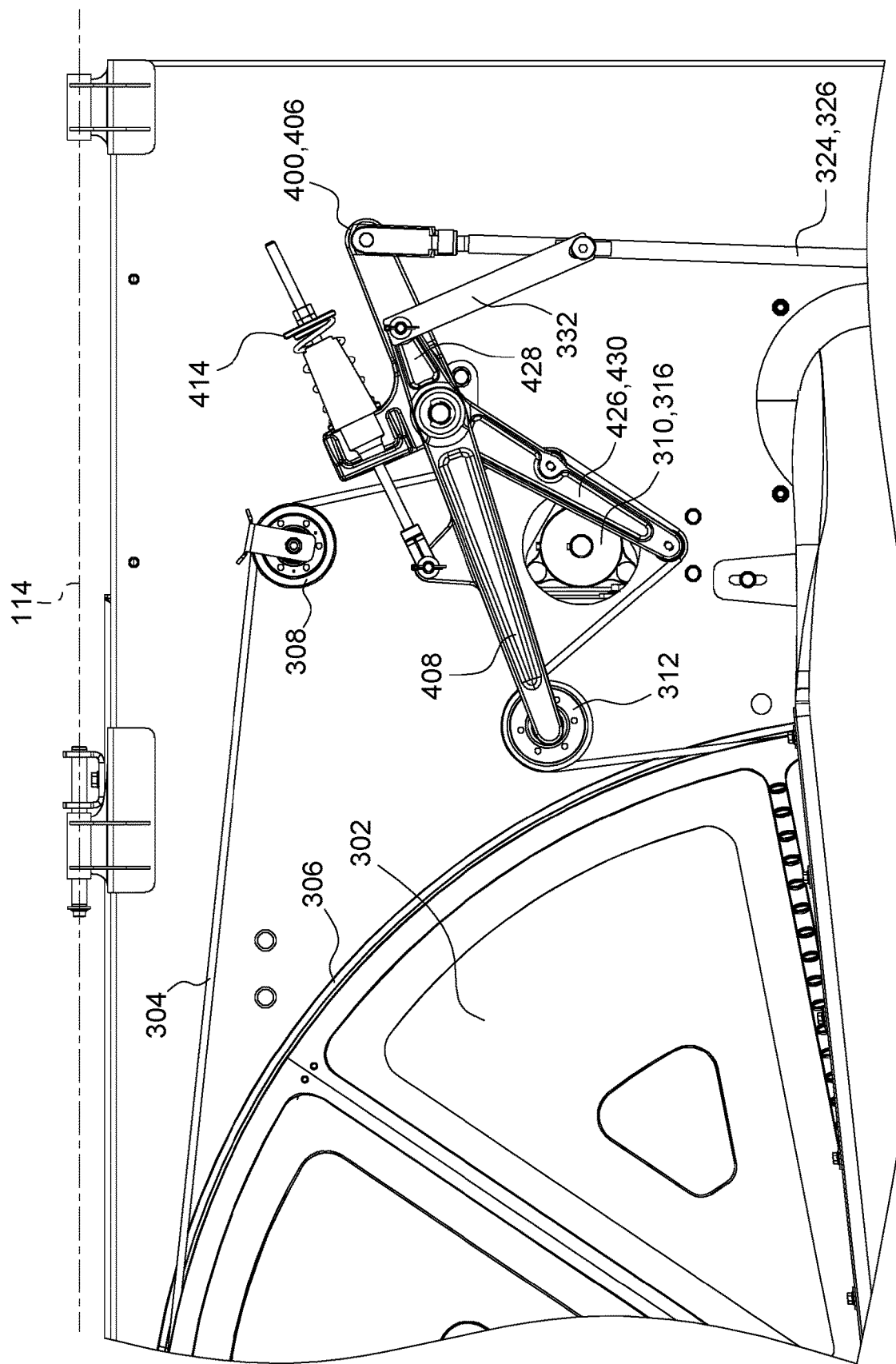
FIG. 6 is a detail view of the tensioning system of the rotary screen assembly of FIG. 1 in the second configuration, according to some implementations of the present disclosure.

The drive shaft 310 is coupled to and driven by the engine of the combine harvester 100. With the tensioning system 314 in a first configuration, as shown in FIG. 3, the drive belt 304 engages the drive shaft 310 and, particularly, a wheel 316 attached to or formed on the drive shaft 310 and rotatable therewith. The drive shaft 310 causes movement of the drive belt 304, which, in turn, causes the rotary screen 302 to rotate about the axis 303. In a second configuration, as shown in FIGS. 5 and 6, the tensioning system 314 has separated the drive belt 304 from the wheel 316 of the drive shaft 310, thereby preventing rotation of the rotary screen 302 by the drive shaft 310. Further, as described in more detail below, the tensioning system 314 is moveable between the first configuration and the second configuration while the drive shaft 310 continues to be rotated by the engine. As a result, a user is able to avoid deactivation of the engine of the combine harvester 100 in order to engage or disengage the rotary screen 302.

Disengagement of the rotary screen 302 from the drive shaft 310 may be desired in order to reposition the rotary screen assembly 200 to provide access to an interior of the engine compartment 108. Access to the interior of the engine compartment 108 may be desired, for example, in order to clean the interior and components contained therein. Maintaining operation of the engine when disengaging the rotary screen 302 allows continued operation of other systems of the combine harvester 100. For example, operation of a compressed air system of the combine harvester 100 may be continued and used to clean dirt and other debris from the engine compartment. Such cleaning may improve cooling of the engine and other systems of the combine harvester 100 that may be diminished over time due to operation of the combine harvester 100.

More particularly, an operator may exit the operator's compartment 104 with the engine of the combine harvester 100 running, open the side panel 110, disengage the drive belt 304 from the wheel 316 of the drive shaft 310 with the tensioning system 314, and proceed to clean the rotary screen 302 as well as other components within the engine compartment 108 using the compressed air system whose operation is maintained due to continued operation of the engine. As a result, the operator avoids having to shut off the engine, leave the operator's compartment, open the side panel, separate the drive belt from the drive shaft, lift the rotary screen assembly 200, return to the operator's compartment, restart the engine, once again leave the operator's compartment, and return to the engine compartment to perform cleaning using the compressed air system. As a result, time required to perform cleaning of the rotary screen 202 or the engine compartment 108 or both may be reduced.

Further, in some implementations, as a result of the tensioning system 314, an amount of tension imparted to the drive belt 304 when the drive belt 304 is engaged with the drive shaft 310 (e.g., with the wheel 316 of the drive shaft 310) is the same or approximately the same as the tension imparted to the drive belt 304 when the tensioning system 314 has disengaged the drive belt 204 from the drive shaft 210.

In some implementations, tension imparted to the drive belt 304 by the tensioning system 314 in the second configuration is less than tension applied to the drive belt 304 by the tension system 314 in the first configuration. Moreover, the tension applied to the drive belt 304 when the tensioning system 314 is in the second configuration is adequate to maintain engagement of the drive belt with the clutch of the tensioning system 314, described in more detail below. As a result, risk of the drive belt becoming disengaged from the tensioning system 314 is reduced or eliminated, which provides for reliably engaging and disengaging the drive belt 304 with the drive shaft 310. As a result, the tensioning system 314 provides for avoidance of intervention from an operator or other person to manually align or otherwise re-engage the drive belt with the drive shaft 310, idler wheels 308 or 312, or any other portion of the belt drive system when re-engagement of the drive belt 304 and the drive shaft 310 is desired.

In some implementations, a static tension applied to the drive belt 304 by the tensioning system 314 with the tensioning system 314 in the first configuration may be 82.6 newtons (N), and, in the second configuration, the tensioning system 314 may impart a static tension in the drive belt 304 of 55.4 N. Consequently, in some implementations, a static tension in the drive belt 304 imparted by the tension system 314 may be 33% less in the second configuration than in the first configuration. In other implementations, the amount of reduction of static tension in the drive belt 304 between the first configuration and the second configuration may be greater than or less than 33%. In still other implementations, the amount of static tension imparted to the drive belt 304 by the tensioning system 314 in both the first configuration and the second configuration may be the same. The values discussed are provided merely as examples and are not intended to limit the scope of the present disclosure. Other implementations within the scope of the present disclosure may produce different tension amounts in the drive belt. Thus, other tension values and other percentage changes in tension in the drive belt between the first configuration and the second configuration are within the scope of the present disclosure.

As discussed in more detail below, maintaining the tension level at a constant level or approximately a constant level, e.g., at a tension level in the second configuration less than a tension level in the first configuration, is attributable to a tensioner of the tensioning system 314 being pivotable, allowing the tensioner to maintain a selected tension within the drive belt 304 as the drive belt 304 is reposition to separate the drive belt 304 from the drive shaft 310. By preventing an increase in tension of the drive belt 304 when the drive belt 304 is disengaged from the drive shaft 310, damage to the drive belt 304 due to over-tensioning is avoided, and, consequently, the life of the drive belt 304 is not diminished.

Referring to FIG. 4, the tensioning system 314 is positioned in the first or engaged configuration in which the drive belt 304 is engaged with drive shaft 310. As explained earlier, in the first configuration, the rotary screen 302 is rotated in response to rotation of the drive shaft 310 via motion transmitted by the drive belt 304. The tensioning system 314 includes a tensioner 400 that is coupled to a shaft 402 and pivotable thereon about an axis 404 defined by the shaft 402. The tensioner 400 includes a first portion 406 and a second portion 408. The first portion 406 and the second portion 408 are rotatable relative to each other about the axis 404. In the illustrated example, the first portion 406 is in the form of an arm that defines a bore 410 through which the shaft 402 extends. The second portion 408 is also in the form of an arm having a bore 412. The shaft 402 extends through the bore 412.

The tensioner 400 also includes a biasing assembly 414 that elastically couples the first portion 406 to the second portion 408. The biasing assembly 414 permits limited rotation of the first portion 406 and the second portion 408 relative to each other. The biasing assembly 414 includes a rod 416 and a biasing component, such as spring 418. In some implementations, the spring 418 may be in the form of a coil spring. The spring 418 is retained on the rod 416 and captured between a first flange 420 engaged with the first portion 406 and a second flange 422 secured to the rod 416. The first and second flanges 420 and 422 include openings through which the rod 416 extends. In some implementations, the first flange 420 is received onto but moveable along the rod 416, and the second flange 422 is secured to the rod 416 at a fixed position. The fixed position of the second flange 422 may be selectively changed to adjust an amount of compression applied to the spring 418 by the first and second flanges 420 and 422. Thus, a position of the second flange 422 along the rod 416 may be adjusted to alter an amount by which the spring 418 is compressed. Compression of the spring 418 imparts a force between the first and second portions 406 and 408 that biases the second portion 408 in a rotational direction of arrow 424. This force imparted to the second arm 408 by the spring 418 operates to place tension in the drive belt 304 via the idler wheel 312. Further, the compressive force imparted to the spring 418 may be selected to produce a selected amount of tension in the drive belt 304.

Figure 7:
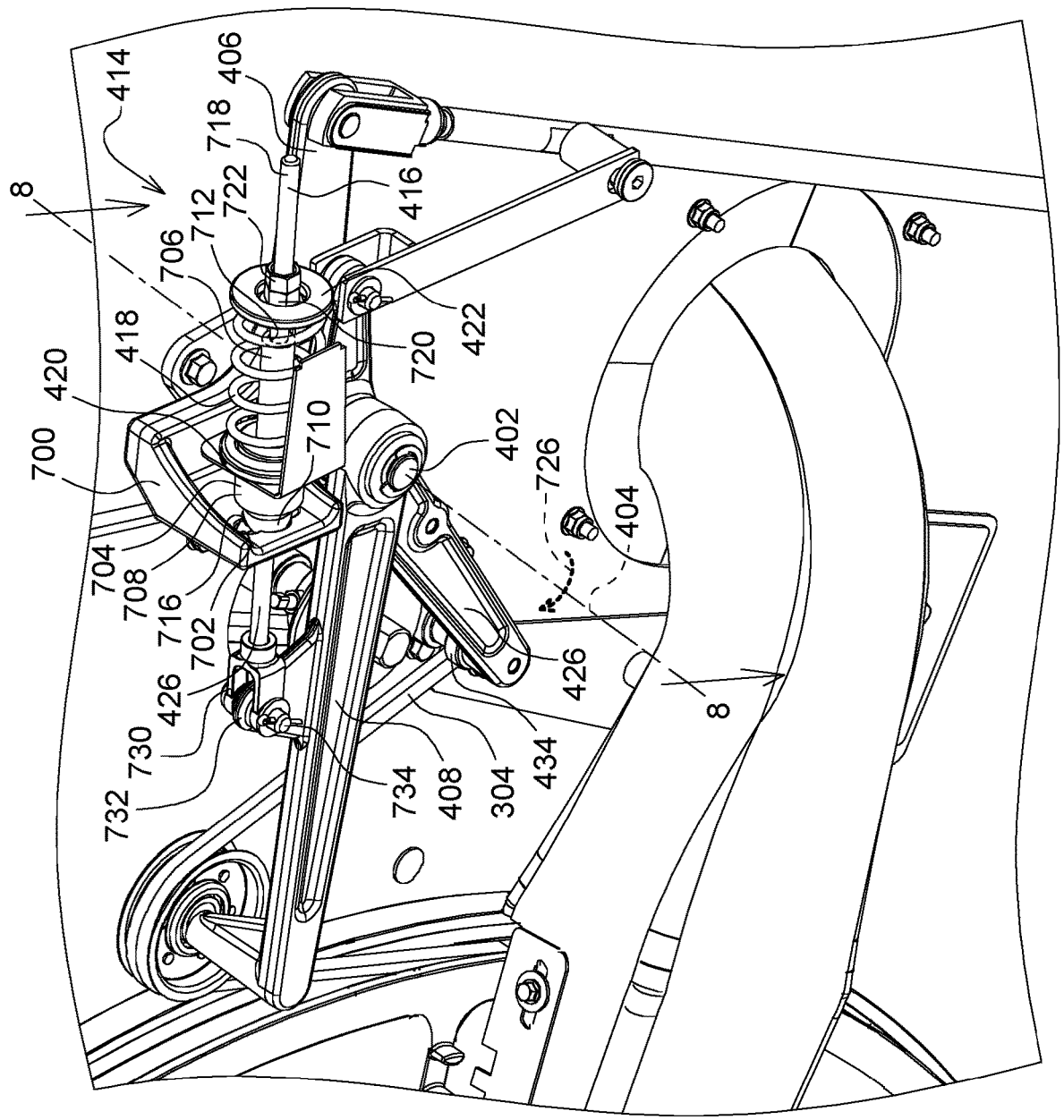
FIG. 7 is a perspective view of an example biasing assembly of the tensioning system of FIG. 1, according to some implementations of the present disclosure.

FIG. 7 is a detail perspective view of a portion of the tensioning system 314 showing the biasing assembly 414. The first portion 406 includes a retainer flange 700. The retainer flange 700 includes an opening 702, which may be in the form of a slot. The rod 416 extends through the opening 702. A cylindrical bearing 704 is received onto the rod 416 and is slideable thereon. The cylindrical bearing 704 includes an elongated sleeve portion 706, an enlarged portion 708 adjacent to the sleeve portion 706, a spherical bearing portion 710, and bore 712 that extends longitudinally therethrough. In some implementations, the sleeve portion 706 may be a component that is separate from the cylindrical bearing 704. Thus, in some implementations, the cylindrical bearing 704 may include the enlarged portion 708 and the spherical bearing portion 710, and the sleeve portion 706 may be a separate component located adjacent to the cylindrical bearing 704 along the rod 416. The rod 416 extends through the bore 712. A shoulder 714, shown in FIG. 4, is defined at an interface of the sleeve portion 706 and the enlarged portion 708. The first flange 420 is received onto the sleeve portion 706 and abuts against the shoulder 714. The spherical bearing portion 710 is received into a recess 716 formed into the retainer flange 700. The recess 716 may have a spherical shape that corresponds to the shape of the spherical bearing portion 710. The opening 702 extends through the recess 716. Engagement between the spherical portion 710 and the recess 716 permits pivoting of the rod 416 relative to retainer flange 700 and, more generally, to the first portion 406 of the tensioner 400.

In the illustrated example, an end 718 of the rod 416 is threaded, and a position of the second flange 422 along the rod 416 is fixed by adjusting a position of a first threaded nut 720 on which the second flange 422 abuts. The threaded end 718 and the first threaded nut 720 have mating threads. By rotating the first nut 720 in a first rotational direction or a second rotational direction opposite the first rotational direction, the first nut 420 moves along the length of the rod 316 in one of a first or second longitudinal direction. As a result, a position of the second flange 422 may be changed. A second threaded nut 722 may also be included. The second nut 722 may be engaged with the first nut 720 to fix a position of the first nut 720 and, hence, the second flange 422. Consequently, the first and second nuts 720 and 722 cooperate to prevent inadvertent rotation of the first nut 420 along the rod 316 and inadvertent movement of the second flange 422 along the rod 416. As explained earlier, adjusting a relative position of the first flange 420 to the second flange 422 alters an amount of compression of the spring 418 and, thus, a force applied to the drive belt 304. The compressed spring 418 urges second portion 408 and the first portion 406 of the tensioner 400 towards each other, applying a moment to the second portion 408 that urges the second portion 408 in a direction of arrow 726.

The rod 416 is pivotably coupled to the second portion 408. In the illustrated example, the rod 316 includes a clevis 730 that receives a protrusion 732 formed on the second portion 408. A fastener 734 extends through the clevis 730 and the protrusion 732 to pivotably couple the rod 416 to the second portion 408.

Figure 8:
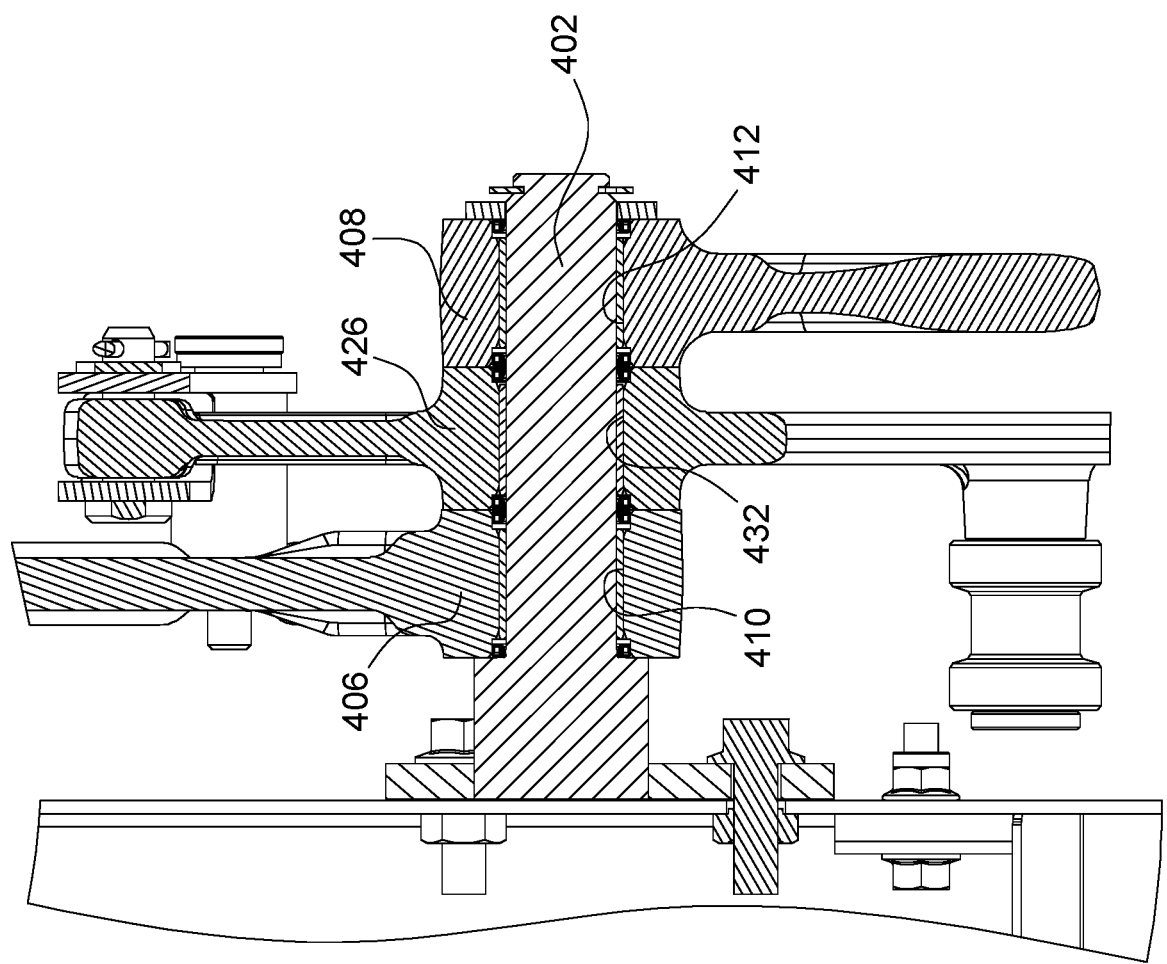
FIG. 8 is a cross-sectional view along a shaft of the example tensioning system of FIG. 1, according to some implementations of the present disclosure.

Referring again to FIG. 4, the tensioning system 314 also includes a clutch 426. The clutch 426 is in the form of an arm that is pivotably received onto the shaft 402 and is laterally positioned on the shaft 402 between the first portion 406 and the second portion 408 of the tensioner 400. The clutch 426 includes a first arm portion 428 and a second arm portion 430. A bore 432 positioned between the first arm portion 428 and the second arm portion 430 extends through the clutch 426. The shaft 402 extends through the bore 432. FIG. 8 is a cross-sectional view that shows a positional arrangement of the first and second portions 406 and 408 of the tensioner 400 and the clutch 426 along the shaft 402.

As shown in FIG. 9, the clutch 426 also includes a pair of rotatable idler wheels 434. The idler wheels 434 are configured to engage the drive belt 304 when the tensioning system 314 is moved from the first configuration to the second configuration to remove the drive belt 304 from the drive shaft 310 and, particularly, from the wheel 316 on the drive shaft 310. In other implementations, the idler wheels 434 may be omitted and protrusions may be formed or included on the second arm portion 430 to engage the drive belt 304 and remove the drive belt 304 from the drive shaft 310 when the tensioning system 314 is moved from the first configuration to the second configuration. The idler wheel 308, idler wheel 312, track 307, idler wheels 434, and wheel 316 are aligned such that the drive belt 304 (or a centerline of the belt 304) lies in a plane.

Referring to FIGS. 3 through 6, the tensioning system 314 also include a handle 318 pivotably coupled to a shaft 320 that defines an axis 322. A linkage 324 connects the handle 318 to the tensioner 400 and the clutch 426. Particularly, the linkage 324 connects to the first portion 406 of the tensioner 400 and the first arm portion 428 of the clutch 426 to the handle 318.

The linkage 324 includes a first link 326 (which may be in the form of a rod) that connects to a first end 328 of the handle 318 and an end 330 of the first portion 406 of the tensioner 400. A second link 332 extends from the first link 326 to the first arm portion 428 of the clutch 426. The first link 326 is pivotably connected to the handle 318 and the first portion 406 of the tensioner 400. For example, a clevis may be provided on the ends of the first link 324 to connect to the handle 318 and the first portion 406. The second link 332 is pivotably connected to the first link 326 along a length thereof and to the first arm portion 428 of the clutch 426. In some implementation, the second link 332 may include devises at opposing ends to form pivotably connections to the first arm portion 428 and the first link 326. The handle 318 and the linkage 324 defines an actuator used to move the tensioning system 314 from the first configuration to the second configuration.

The handle 318 is pivotably about the axis 322 defined by the shaft 320. Particularly, in a first position shown in FIG. 3, the handle 318 is pivotable about the axis 322 in a first direction indicated by arrow 321 to place the handle 318 into a second position, shown in FIG. 5. Pivoting the handle 318 form the first position in the direction of arrow 321 causes the first link 326 to move in the direction of arrow 323. Movement of the first link 326 in the direction of arrow 323 causes the tensioner 400 and the clutch 426 to pivot about the axis 404 in the direction of arrow 325, which results in the drive belt 304 being disengaged from the wheel 316. In the second position, shown in FIG. 5, the handle 318 is returned to the first position by rotation of the handle 318 about the axis 322 in the direction of arrow 327, opposite the direction of arrow 321. As a result, the first link 326 is moved in the direction of arrow 329, causing the tensioner 400 and the clutch 426 to pivot about the axis 404 in the direction of arrow 331. As a result, the handle 318 is returned to the first position, and the tensioning system 314 is returned to the first configuration.

As shown in FIG. 4, for example, a length of the first arm portion 428 of the clutch 426 measured perpendicularly from the axis 404 of the shaft 402 is less than a length of the first portion 406 of the tensioner 400 also measured perpendicularly from the axis 404 of the shaft 402. As a result of the difference in these lengths, the first portion 406 of the tensioner 400 is rotated about axis 404 a lesser amount than the clutch 426.

In operation, as the handle 318 is moved from the first position, shown in FIG. 3, to the second position, shown in FIG. 5, the tensioning system 314 is moved from the first configuration in which the drive belt 304 is engaged with the wheel 316 to the second configuration in which the drive belt 304 is disengaged from the wheel 316. During this movement, the clutch 426 rotates about the axis 404 such that the idler wheels 434 engage the drive belt 304 and remove the drive belt 304 from the wheel 316. This relative movement of the clutch 426 and the wheel 316 results in the wheel 316 passing between the idler wheels 434. The tensioner 400 is also rotated about the axis 404. As shown in FIG. 9, the drive belt 304 is fully separated from the wheel 316 when the tensioning system 314 is in the second configuration.

In the illustrated example, the amount of rotation of the tensioner 400 is less than the amount of rotation of the clutch 426. Because the tensioner 400 is permitted to rotate on the shaft 402 about the axis 404, the amount of force applied to the drive belt 304 by the biasing assembly 414, applied through the idler wheel 312, may be less than the force applied when the tensioning system 314 is in the first configuration. Consequently, in the second configuration, the tensioner 400 reduces tension of the drive belt 304 compared to a tension level maintained in the drive belt 304 when the tensioning system 314 is in the first configuration. In some implementations, the tension level applied to the drive belt 304 by the tensioner 400 in the second configuration is the same or less than the level of tension applied to the drive belt 304 by the tensioning system 400 in the first configuration. As a result, over-tensioning of the drive belt 304 is avoided, prolonging the useful life of the drive belt 304.

Rotation of the handle 318 about the axis 322 from the second position, shown in FIG. 5, to the first position, shown in FIG. 3, returns the tensioning system to the first configuration from the second configuration. When the handle 318 is moved to the first position, the linkage 324 pivots the tensioner 400 and the clutch 426 about the axis 402. As the clutch 426 pivots, the drive belt 304 reengages with the wheel 316, and the idler wheels 434 disengage from the drive belt 304. Further, because the idler wheel 308, idler wheel 312, wheel 316, and idler wheels 434 are aligned, maintaining the drive belt 304 in a plane, and tension is maintained on the drive belt 304 when disengaged from the wheel 316, the drive shaft 310 may be maintained in an rotating condition as the tensioning system 314 is moved between the first and second configurations.

In some implementations, one or more of the idler wheel 308, idler wheel 312, wheel 316, and idler wheels 434 may define a groove, such as in the form of a V, and the drive belt 304 may include a cross-sectional shape that conforms to the groove, such a V-shape. In some implementations, the track 307 may also define a profile that conforms to the cross-sectional shape of the drive belt 304, such as a V-shape.

Without in any way limiting the scope, interpretation, or application of the claims appearing below, a technical effect of one or more of the example implementations disclosed herein is providing a tensioning system that is operable to maintain tension on a drive belt when the drive belt is disengaged from a power source, such as a drive shaft, at a desired tension level that does not over-tension the drive belt. Maintaining a desired level of tension while the drive belt is disengaged form the drive shaft avoids damage to the drive belt and prolongs the useful life of the drive belt. Another technical effect of one or more of the example implementations disclosed herein is the conservation of resources, such as time and fuel, by maintaining continuous operation of the engine of the vehicle while engaging and disengaging the drive belt.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A tensioning device comprising:
   a tensioner pivotable about a first axis, the tensioner comprising:
      a first arm rotatable about the first axis;
      a second arm rotatable about the first axis, the first arm and the second arm pivotable relative to each other;
      a biasing assembly that couples the first arm and the second arm, the biasing assembly elastically coupling the first arm and the second arm; and
      a first wheel disposed at an end of the second arm, the first wheel configured to engage a drive belt;
   a third arm pivotable about the first axis; and
   an actuator coupled to the tensioner and the third arm, the tensioner and the third arm moveable about the first axis between a first configuration in which the third arm is configured to be disengaged from the drive belt when the actuator is in a first position and an second configuration in which the third arm is configured to be engaged with the drive belt when the actuator is in a second position, different from the first position.

2. The tensioning device of claim 1, wherein the first arm, the second arm, and the third arm are mounted on a common shaft that defines the first axis.

3. The tensioning device of claim 2, wherein the third arm is disposed between the first arm and the second arm along the shaft.

4. The tensioning device of claim 1, wherein the biasing assembly comprises:
   a first flange engaged with the first arm;
   a biasing component;
   a rod pivotably coupled to the second arm; and
   a second flange coupled to the rod, the biasing component captured between the first flange and the second flange.

5. The tensioning device of claim 4, wherein the biasing element is a spring, and wherein the rod extends through the first flange and the second flange.

6. The tensioning device of claim 4, wherein rotation of the second arm in a first rotational direction relative to the first arm compresses the spring.

7. The tensioning device of claim 1, wherein the actuator comprises:
   a handle pivotable about a second axis; and
   a linkage connecting the handle to the first arm and the third arm, the first arm rotated by a first amount and the third arm rotated by a second amount greater than the first amount when the handle is rotated about the second axis from the first position to the second position.

8. The tensioning device of claim 7, wherein the linkage comprises:
   a first link extending from the handle to the first arm; and
   a second link extending from the first link to the third arm.

9. The tensioning device of claim 8, wherein the first link is coupled to the first arm at a first end of the first arm, wherein the second link is coupled to a first end of the third arm, and wherein a length of the first end of the third arm is less than a length of the first end of the first arm.

10. The tensioning device of claim 1, wherein the third arm comprises at least one second wheel and wherein the at least one second wheel is configured to engage the belt when the third arm is in the second configuration.

11. The tensioning device of claim 1, wherein movement of the handle from the first position to the second position causes a first amount of rotation of the first arm and a second amount of rotation of the third arm, the first amount of rotation being less than the second amount of rotation.

12. A belt drive system comprising:
 a rotatable screen defining a circumferential surface;
 a drive belt engaged with a portion of the circumferential surface;
 a shaft comprising a first wheel that is selectively engageable with the belt, the rotatable screen rotatable in response to rotation of the shaft that is transmitted to the rotatable screen by the belt;
 a tensioning device comprising:
  a tensioner pivotable about a first axis, the tensioner comprising a second wheel that engages the drive belt to produce a selected amount of tension in the drive belt;
  a clutch arm pivotable about the first axis; and
  an actuator coupled to the tensioner and the clutch arm, the actuator movable between a first position in which the tensioner and the clutch arm are pivoted into a first configuration in which the clutch arm is free from engagement with the drive belt and a second position in which the tensioner and the clutch arm are pivoted into a second configuration in which the clutch arm engages the drive belt to disengage the drive belt from the first wheel.

13. The belt drive system of claim 12, wherein the tensioner comprises a first arm and a second arm that are elastically coupled together, wherein the second wheel is coupled to the second arm, and wherein an elastic force applied between the first arm and the second arm is applied to the drive belt via the second wheel to generate the selected amount of tension within the drive belt.

14. The belt drive system of claim 12, wherein a first amount of tension generated within the drive belt by the tensioner when the tensioner is in the first configuration is the same as or greater than a second amount of tension generated within the drive belt by the tensioner when the tensioner is in the second configuration.

15. The belt drive system of claim 13, wherein the actuator comprises:
 a handle pivotably about a second axis; and
 a linkage connecting the handle to the clutch arm and the first arm, the clutch arm rotated by a first amount and the first arm rotated by a second amount less than the first amount when the handle is rotated about the second axis from the first position to the second position.

16. The belt drive system of claim 15, wherein the linkage comprises:
 a first link extending from the handle to the first arm; and
 a second link extending from the first link to the clutch arm.

17. The belt drive system of claim 15, wherein the at least one third wheel comprises two third wheels that are offset from each other along a length of the clutch arm, wherein movement of the actuator from the first position to the second position causes rotation of the second arm in a first rotational direction towards the shaft such that the first wheel is passed between the two third wheels, resulting in the two third wheels separating the drive belt from the first wheel.

18. The belt drive system of claim 13, further comprising a biasing assembly that couples the first arm and the second arm, the biasing assembly comprising:
 a first flange engaged with the first arm;
 a biasing component;
 a rod pivotably coupled to the second arm; and
 a second flange coupled to the rod,
 wherein the biasing component is captured between the first flange and the second flange.

19. The belt drive system of claim 12, wherein the clutch arm comprises at least one third wheel that engages the drive belt to disengage the drive belt from the first wheel when the actuator is moved from the first position to the second position.

20. The belt drive system of claim 19, wherein the biasing element is a spring, and wherein the rod extends through the first flange and the second flange.

* * * * *